United States Patent [19]
Yokoyama et al.

[11] Patent Number: 5,392,364
[45] Date of Patent: Feb. 21, 1995

[54] OBJECT INSPECTION METHOD EMPLOYING SELECTION OF DISCERNING FEATURES USING MAHALANOBIS DISTANCES

[75] Inventors: Haruhiko Yokoyama, Osaka; Masaya Nakao, Kadoma, both of Japan

[73] Assignee: Matsushita Electric Industrial Co., Ltd., Osaka, Japan

[21] Appl. No.: 885,837

[22] Filed: May 20, 1992

[30] Foreign Application Priority Data

May 23, 1991 [JP] Japan .................. 3-118484

[51] Int. Cl.⁶ ....................... G06K 9/46; G06K 9/68
[52] U.S. Cl. ........................................ 382/16; 382/34
[58] Field of Search ................. 382/16, 14, 15, 30, 382/34, 36, 37, 39

[56] References Cited

U.S. PATENT DOCUMENTS

| | | | |
|---|---|---|---|
| 4,066,999 | 1/1978 | Spanjersberg | 382/14 |
| 4,441,205 | 4/1984 | Berkin et al. | 382/14 |
| 4,658,429 | 4/1987 | Orita et al. | 382/36 |
| 5,042,073 | 8/1991 | Collot et al. | 382/38 |
| 5,046,111 | 9/1991 | Cox et al. | 382/15 |
| 5,161,204 | 11/1992 | Hutcheson et al. | 382/16 |

*Primary Examiner*—Michael T. Razavi
*Assistant Examiner*—David Fox
*Attorney, Agent, or Firm*—Wenderoth, Lind & Ponack

[57] ABSTRACT

A method for discerning whether an object to be inspected is acceptable or not is based on feature values with respect to a binary-coded image of the object. The method includes the steps of coding image data of the object into binary digits to obtain the binary-coded image, calculating at least three feature values based on a predetermined sample group of acceptable objects and a predetermined sample group of unacceptable objects, obtaining a Mahalanobis' generalized distance between the sample groups of the acceptable objects and the unacceptable objects with respect to each of the calculated feature values, comparing each of the distances with a first predetermined value and then selecting as a first representative feature value the distance which is not smaller than the first predetermined value, obtaining a Mahalanobis' generalized distance between groups of acceptable objects and unacceptable objects with respect to the feature values except for the feature value selected as the first representative feature value and the first representative feature value, and comparing each of the distances with a second predetermined value and then selecting as a second representative feature value the distance which is not smaller than the second predetermined value, so that it is discerned whether the object is acceptable or not based on the first and/or first and second feature values with respect to the binary-coded image of the object.

8 Claims, 5 Drawing Sheets

OBJECT INSPECTION METHOD EMPLOYING SELECTION OF DISCERNING FEATURES USING MAHALANOBIS DISTANCES

BACKGROUND OF THE INVENTION

The present invention relates to a discerning method applied to a character/graphics recognition apparatus, particularly for the purpose of effectively discerning whether character/graphics patterns are acceptable or not.

Figure 4:
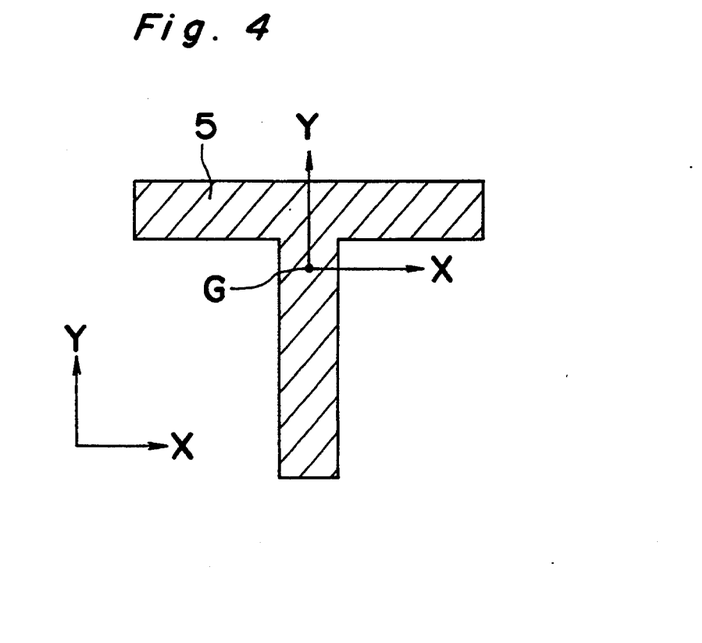
FIG. 4 is a character pattern indicative of an acceptable object to be inspected.
Figure 5:
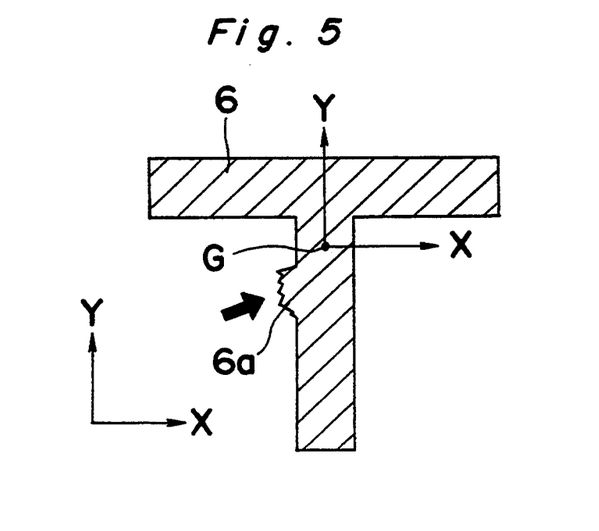
FIG. 5 is a character pattern indicative of an unacceptable object to be inspected.

When character/graphic image printed on an electronic component or the like is recognized and discerned, the geometric feature of the a character/graphic image is extracted from the data obtained by reading and quantizing the character/graphic image. As one example of a discerning method, a description with reference to FIGS. 4 and 5 will be made in which a printed character "T" is to be discerned. In the drawings, a character area is denoted by oblique lines. In FIG. 4, the character is an acceptable character 5. The character in FIG. 5 is an unacceptable character 6 having a blur 6a. For discerning the blur 6a as unacceptable, the image data from an image pick-up device such as a camera is turned to binary digits by an image binary-coding means and then, the obtained binary image is sent to a calculating means, where a shape feature value is calculated. Whether the printed character "T" as an object to be detected is acceptable or unacceptable is discerned from the resultant data. This discerning method uses a plurality of feature values, and in particular, generally nine kinds of feature values are used as follows:

[1] area of a character part
[2] peripheral length of the character part
[3] frame length of the character part
[4] peripheral angle distribution of the character part
[5] frame angle distribution of the character part
[6] projective length of the character part relative to an X axis
[7] projective length of the character part relative to a Y axis
[8] secondary moment around X' axis passing the center of gravity of the character part
[9] secondary moment around Y' axis passing the center of gravity of the character part Each of the above feature values will be depicted more in detail.

Figure 6:
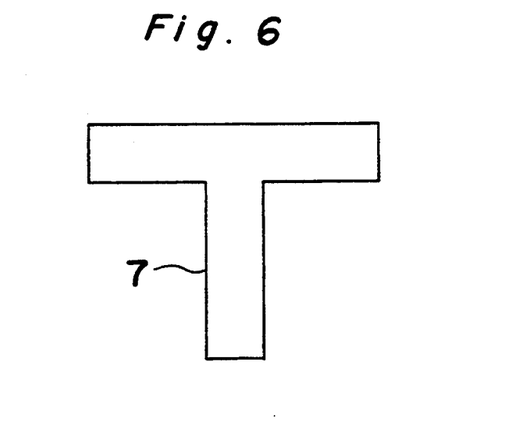
FIG. 6 is a diagram explanatory of the peripheral length of a character pattern.
Figure 7:
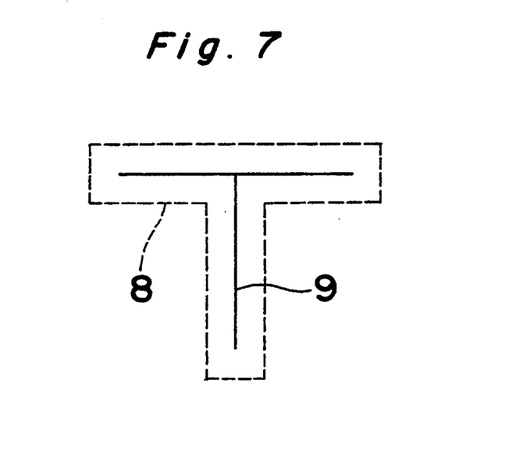
FIG. 7 is a diagram explanatory of the frame length of a character pattern.
Figure 8A:
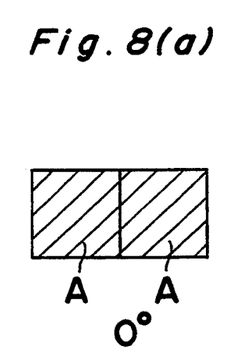
FIGS. 8(a)-8(d) are diagrams explanatory of the peripheral length and frame length of a character pattern.
Figure 8B:
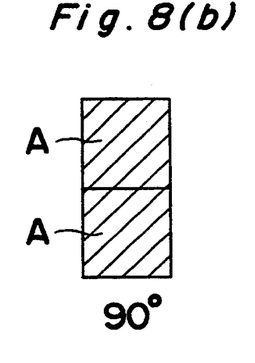
Figure 8C:
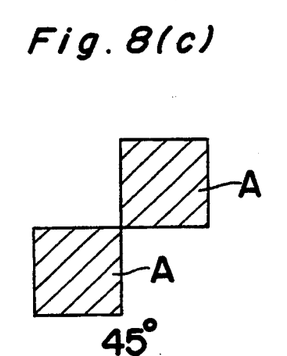
Figure 8D:
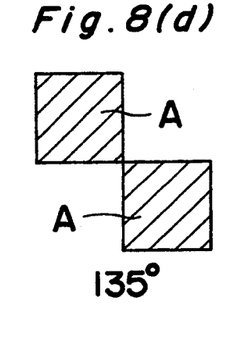

The area of a character part [1] represents the number of pixels occupying the character part. The pixel is a unit of image information. The peripheral length of the character part [2] is the length of the periphery of the character "T" indicated by a solid line 7 in FIG. 6 when the length of each pixel is rendered 1. The frame length of the character part [3] is the length of a segment of the frame of the character "T" which is drawn by a solid line 9 within a broken line 8 in FIG. 7 while the length of each pixel is 1. Moreover, the peripheral angle distribution of the character part [4] and the frame angle distribution of the character part [5] indicate the distribution of the peripheral length and frame length of the character part, respectively, obtained by summing the connecting number of times when the two adjacent pixels A, A are connected in transverse, vertical, right slantwise and left slantwise directions, as shown in FIGS. 8(a)–8(d). The projective length of the character part relative to the X axis [6] and the projective length of the character part relative to the Y axis [7] represent the length of a straight line connecting a segment in the X axis direction and in the Y axis direction of the character part with a point outside the character part, respectively. The secondary moment around the X' axis passing the center of gravity of the character part [8] is a mean of a square of the difference between the center of gravity G and the segment in the X' axis direction in FIG. 4, which represents the variance to the X' axis direction. Meanwhile, the secondary moment around the Y' axis passing the center of gravity of the character part [9] is a mean of a square of the difference between the center of gravity G and the segment in the Y' axis direction of FIG. 4, indicative of the variance to the Y' axis direction.

When the character pattern "T" is to be discerned with use of each feature value as above, although there is little difference in the feature value of the area between the acceptable character 5 in FIG. 4 and the unacceptable character 6 having the blur 6a in FIG. 5, the peripheral length of the acceptable character 5 is smaller than that of the unacceptable character 6. Therefore, it is possible to roughly discern the characters 5 and 6 by referring to the peripheral length thereof, which would be hardly achieved with reference only to the feature value of the area. Since this fact holds true for the other kinds of the feature values, it is necessary to make a decision after calculating the each kind of feature value.

However, in the discerning method described above, a quantitative reference is not set in many cases, and therefore it is uncertain which of the feature values is to be used for proper discerning. That is, calculations for many kinds of the feature values should be repeated until the difference between the acceptable object 5 and unacceptable object 6 becomes clearly identified. As such, the calculation results in wasteful consumption of time, requiring a computer of a large capacity. Although a neural network system has been employed to discern the object of this kind in the past years, the layered circuit structure of the neural network system is complicated, and therefore, the learning time through back propagation is elongated as the number of the kinds of the feature values fed to an image input means is increased. In some cases, it is difficult for the neutral network to converge on a conclusion particularly when too much information is input, and processing is possibly disabled.

SUMMARY OF THE INVENTION

The object of the present invention is therefore to provide an improved discerning method of an object, with an aim to substantially eliminating the aforementioned disadvantages inherent in the prior art.

In order to accomplish the above-described object of the present invention, according to one aspect of the present invention, a method for discerning whether an object to be inspected is acceptable or not based on a feature value with respect to a binary-coded image of the object, which comprises the steps of:

coding image data of the object into binary digits to obtain the binary-coded image;

calculating at least three feature values of the binary-coded image based on a predetermined sample group of acceptable objects and a predetermined sample group of unacceptable objects;

obtaining a Mahalanobis' generalized distance between the sample groups of the acceptable objects and the unacceptable objects with respect to each of the calculated feature values;

comparing each of the distances with a first predetermined value and then selecting as a first representative feature value the distance which is not smaller than the first predetermined value;

obtaining a Mahalanobis' generalized distance between groups of acceptable objects and unacceptable objects with respect to the feature values except for the feature value selected as the first representative feature value and the first representative feature value; and comparing each of the distances with a second predetermined value and then selecting as a second representative feature value the distance which is not smaller than the second predetermined value, so that it is discerned whether the object is acceptable or not based on the first and/or first and second feature values with respect to the binary-coded image of the object.

When samples of an acceptable object group and an unacceptable object group are picked up, the image data of the object is converted to binary digits. Then, a plurality of feature values of the binary image are calculated. Preferably, each feature value is divided by a standard deviation of a group comprised of the acceptable group and unacceptable group, thereby normalizing the feature value to make the variance of all the feature values equal. Subsequently, the Mahalanobis' generalized distance between the two sets of the acceptable group and unacceptable group is obtained for each feature value. At this time, as the Mahalanobis' generalized distance is larger, the acceptable group can be distinguished from the unacceptable group more clearly. Therefore, the feature value that has a Mahalanobis' generalized distance which is not smaller than a predetermined value is preferably selected with priority. Sequencing is carried out in this manner afterwards.

Then, the image data of the object to be inspected is converted to binary digits in the same manner as above and the feature values are calculated.

Thereafter, in order to discern the object, the feature values are selected in the order of priority. Accordingly, it becomes possible to discern the object in the early several stages of inspection, without processing of the whole of the feature values. The discerning time is shortened.

BRIEF DESCRIPTION OF THE DRAWINGS

These and other objects and features of the present invention will become clear from the following description taken in conjunction with the preferred embodiments thereof with reference to the accompanying drawings in which.

DETAILED DESCRIPTION OF THE PREFERRED EMBODIMENT

Before the description of the present invention proceeds, it is to be noted that like parts are designated by like reference numerals throughout the accompanying drawings.

Figure 1:
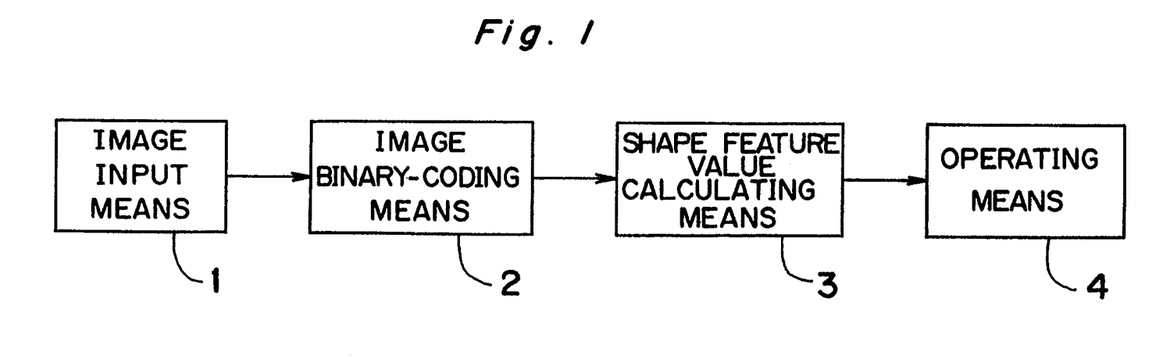
FIG. 1 is a structural block diagram explanatory of a discerning method of an object to be inspected according to one embodiment of the present invention.

A discerning method according to the embodiment is applied to detecting whether or not a character pattern printed on various kinds of electronic components or the like is acceptable, whereby the Mahalanobis' generalized distance between a group of acceptable objects and a group of unacceptable objects is obtained from the data of the shape feature values calculated by a shape feature value calculating means 3 in FIG. 1, to thereby select the representative feature value of shape.

The following description of the embodiment is directed to discerning of a printed character "T" shown in FIGS. 4 and 5. Moreover, in order to discern the printed character "T" of FIG. 5 to be unacceptable because of the blur 6a as in the conventional method, the aforementioned nine kinds of feature values are prepared for selection with priority.

Referring to FIG. 1, the image data from an image pick-up device such as a camera which picks up the printed character "T" is transmitted to an image input means 1. The output signal of the input means 1 is fed to an image binary-coding means 2, where the image data is converted to binary digits (step #1 in FIG. 9). The output signal of the image binary-coding means 2 is input to a calculating means 3 which calculates the above nine kinds of shape feature values (step #2 in FIG. 9). When the output data from the calculating means 3 is sent to an operating means 4, the Mahalanobis' generalized distance between a group of acceptable objects and a group of unacceptable objects is calculated by the operating means 4 and the feature value having a larger Mahalanobis' generalized distance is selected with priority (step #3 in FIG. 9). In consequence, as described below, an object to be inspected can be discerned as acceptable or not using the selected feature values.

Figure 9:
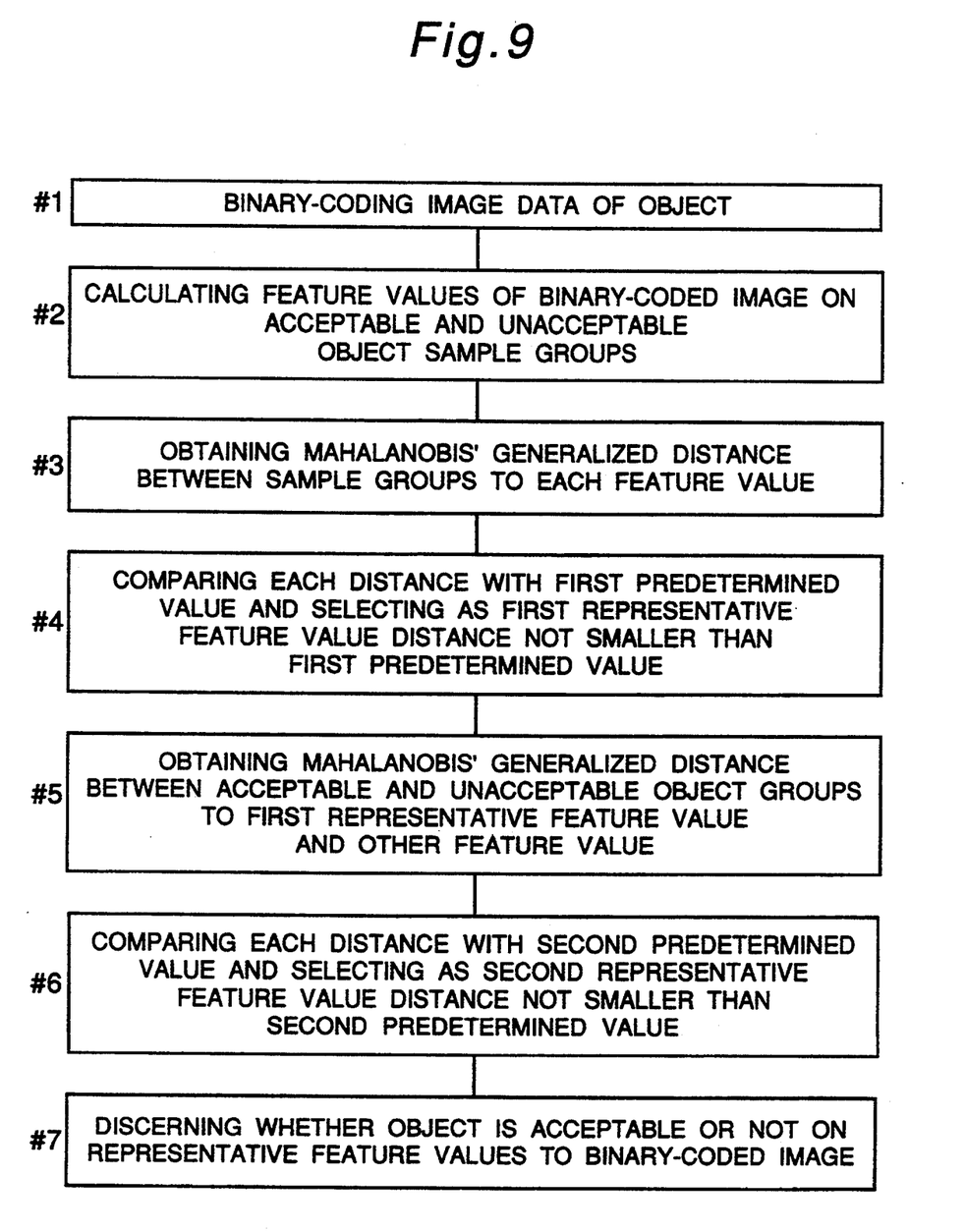
FIG. 9 is a flowchart showing the embodiment of the present invention.

In the first place, many samples of acceptable groups and unacceptable groups are prepared and picked up by the image pick-up device (step #1 in FIG. 9). Nine kinds of feature values [1]-[9] are obtained from the image data of the image input means 1 by the feature value calculating means 3 (step #2 in FIG. 9). Each kind of the feature value is divided by a standard deviation of a group which is the sum of its acceptable group and its unacceptable group, to thereby normalize the feature values so that the standard variance becomes the same among all the feature values.

Subsequently, the Mahalanobis' generalized distance D between the two sets of the acceptable group I and unacceptable group II is obtained for each of the nine kinds of feature values by an operating means 4 (step #3 in FIG. 9).

The above Mahalanobis' generalized distance D will be described with reference to FIG. 2 in an example of the feature value of the area of the character part.

Figure 2:
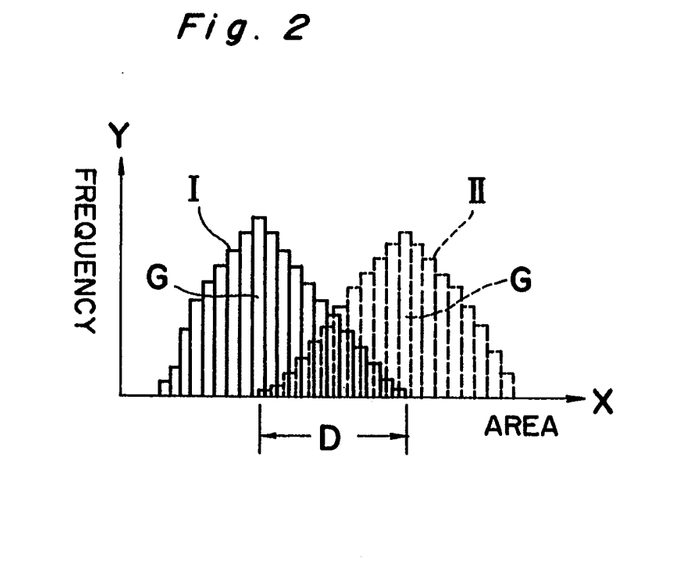
FIG. 2 is a diagram explanatory of the Mahalanobis' generalized distance between a group of acceptable objects and a group of unacceptable objects.

In FIG. 2, the X axis represents the area of the character part, and the Y axis shows the frequency of the samples. Supposing that the acceptable group I and unacceptable group II assume such a distribution of the feature value of the area as shown in FIG. 2, the Mahalanobis' generalized distance D is the distance of a straight line connecting the center of gravity G of the acceptable group I with that of the unacceptable group II.

The Mahalanobis' generalized distance D makes clear the state of separation between two sets, which will be calculated by the equation (1) below.

More specifically, on the premise that $\Sigma_{(1)} = \Sigma_{(2)}$, $\Sigma_{(1)}$ being the acceptable group I and $\Sigma_{(2)}$ being the unacceptable able group II, the Mahalanobis' generalized distance D between the two sets is:

$$D^2 = (\mu^{(2)} - \mu^{(1)})' \Sigma^{-1} (\mu^{(2)} - \mu^{(1)}) \qquad (1)$$

Accordingly, the distance between the centers of gravity of the acceptable and unacceptable groups I and II, namely, the Mahalanobis' generalized distance D is obtained by calculating the square root of $D^2$.

In the equation, $\Sigma$ is a variance-covariant matrix (for example, $\Sigma = V_{11}$ in the feature value [1], $\Sigma = V_{22}$ in the feature value [2], where V is a variance), $\Sigma^{-1}$ is an inverse matrix, $\mu^{(1)}$ the center of gravity of the acceptable group I, $\mu^{(2)}$ the center of gravity of the unacceptable group II, and $(\mu^{(2)} - \mu^{(1)})'$ is a converse matrix of $(\mu^{(2)} - \mu^{(1)})$.

As a result of the above calculation, the Mahalanobis' generalized distance D for each feature value is assumed to be:

| | | |
|---|---|---|
| [1] | area of the character part | 12.4 |
| [2] | peripheral length of the character part | 5.4 |
| [3] | frame length of the character part | 3.8 |
| [4] | peripheral angle distribution of the character part | 21.2 |
| [5] | frame angle distribution of the character part | 4.7 |
| [6] | projective length relative to the X axis of the character part | 9.9 |
| [7] | projective length relative to the Y axis of the character part | 17.3 |
| [8] | secondary moment around X' axis passing the center of gravity of the character part | 7.4 |
| [9] | secondary moment around Y' axis passing the center of gravity of the character part | 6.1 |

Since each of the Mahalanobis' generalized distances D represents the state of separation between two sets, the distance having the largest value among the distances enables distinct discerning of acceptable and unacceptable objects. Therefore, the peripheral angle distribution of the character part [4] which is 21.2 above and then, the projective length to Y axis of the character part [7] which is 17.3 above are selected in the order of priority (step #4 in FIG. 9). At this time, each distance is compared with a first predetermined value, for example, 17.3 and the distances [4] and [7] are selected which are not smaller than the first predetermined value.

However, for better discerning, that is, in order to increase the recognition accuracy of the object, it is more preferable to combine the feature value of the first priority with the other eight kinds of feature values to obtain the Mahalanobis' generalized distances D (step #5 in FIG. 9), to thereby determine the feature value of the second priority. The Mahalanobis' generalized distance D in this case will be described with reference to FIG. 3 wherein the peripheral angle distribution of the character part [4] of the first priority (hereinafter which is called "first representative feature value") is designated on the X axis, while the corresponding feature value, for example, the area of the character part [1] is shown on the Y axis, and the respective frequencies of the feature values are shown on the Z axis. A three-dimensional distribution appears for each group, and the Mahalanobis' generalized distance D is the distance of a straight line connecting the center of gravity G of the acceptable group I and the center of gravity G of the unacceptable group II.

Figure 3:
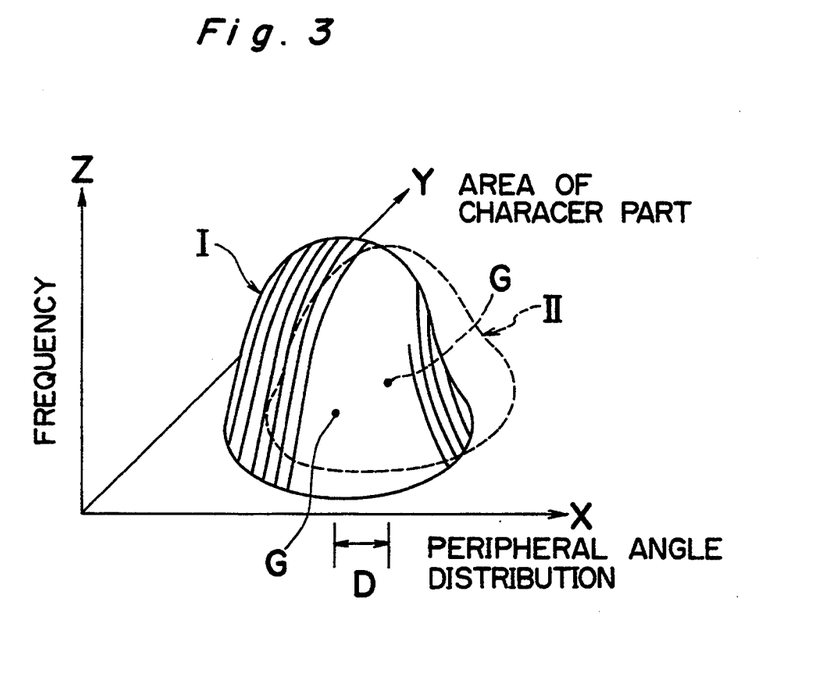
FIG. 3 is a diagram explanatory of the Mahalanobis' generalized distance among a plurality of feature values.

The Mahalanobis' generalized distance D is processed in three dimensions through transformation of the foregoing equation (1) when the acceptable group I and unacceptable group II Are represented by $\Sigma_{(1)(2)}$, $\Sigma_{(1)(3)}$, $\Sigma_{(2)(3)}$. The variance-covariant matrix $\Sigma$ is, for example, as follows:

$$\Sigma = \begin{bmatrix} V_{11} & Cov_{1,4} \\ Cov_{1,4} & V_{44} \end{bmatrix}$$

in the feature values [1] and [4], $$\Sigma = \begin{bmatrix} V_{22} & Cov_{2,4} \\ Cov_{2,4} & V_{44} \end{bmatrix}$$

in the feature values [2] and [4], where Cov is covariance.

In consequence, each Mahalanobis' generalized distance D for each of the feature values [1]-[3] and [5]-[9] is assumed to be as follows:

| | | |
|---|---|---|
| [1] | area of the character part | 35.4 |
| [2] | peripheral length of the character part | 23.3 |
| [3] | frame length of the character part | 25.8 |
| [5] | frame angle distribution of the character part | 28.8 |
| [6] | projective length to X axis of the character part | 31.2 |
| [7] | projective length to Y axis of the character part | 39.4 |
| [8] | secondary moment around X' axis passing the center of gravity of the character part | 29.3 |
| [9] | secondary moment around Y' axis passing the center of gravity of the character part | 26.4 |

Among the above-calculated values of the Mahalanobis' generalized distances D, the largest value is 39.4, and therefore the projective length relative to the Y axis of the character part [7] showing the largest value of 39.4 should be selected as the feature value of the second priority (hereinafter which is called "second representative feature value") (step #6 in FIG. 9). At this time, each distance is compared with a second predetermined value, for example, 39.4 and the distances [7] is selected which is not smaller than the first predetermined value.

Thereafter, one of the seven kinds of feature values without being selected, and the selected feature values [4] and [7] are combined, thereby obtaining the Mahalanobis' generalized distances D and determining the feature value of the third priority (hereinafter which is called "third representative feature value") (not shown in FIG. 9). In the manner as above, feature values to be selected next are sequenced through repetition of the above procedure.

After sequencing the feature values, the outer appearance of an object can be inspected with use of the feature values of, e.g., the first to third priorities (step #7 in FIG. 9).

When the outer appearance of the character "T" is to be inspected, first, the character "T" is picked up and the image data from the image input means 1 is converted to binary digits by the image coding means 2. Then, the binary-coded image is sent to the calculating means 3, where a plurality of the selected feature values are calculated.

Before discerning the character "T" in the operating means 4, the feature values are compared with each other in accordance with their priority. Accordingly, the character "T" can be discerned as acceptable or unacceptable in the early stage of inspection since it is not necessary to take all the feature values into consideration. Thus, discerning of the character "T" is achieved in a short time. That is, in the above embodiment, the character "T" can be discerned as acceptable or unacceptable in the early stage of inspection where only one feature value with the first priority (the first representative feature value) or the two feature values with the first and second priorities (the first and second representative feature values) or the three feature values with the first through third priorities (the first through third representative feature values) are obtained as above described, and thus it is not necessary that all nine kinds of feature values to be taken into consideration.

The discerning of the object is accomplished as follows: Supposing that the selected representative feature values are $X_1, \ldots, X_n$, mean of $X_i$ $$\overline{\mu_i} = \frac{\mu_i^{(1)} + \mu_i^{(2)}}{2}$$

where $\mu^{(1)}$ is means of acceptable group, and $\mu^{(2)}$ is means of unacceptable group;

variance of $X_i$ $V_i$;
covariance of $X_i$ and $X_j$ $Cov_{i,j}$;
variance-covariance matrix $$\Sigma = \begin{bmatrix} V_1 & Cov_{1,2} & \ldots & Cov_{1,n} \\ & V_2 & & \cdot \\ \cdot & & & \cdot \\ \cdot & & & \cdot \\ \cdot & & & \cdot \\ Cov_{n,1} & & \ldots & V_n \end{bmatrix}$$

Using the matrix, the following equation is operated:

$$D_2{}^2 - D_1{}^2 = 2(x - \overline{\mu})' \Sigma^{-1} d,$$

where $$x - \mu = \begin{pmatrix} X_1 - \overline{\mu}_1 \\ \cdot \\ \cdot \\ \cdot \\ X_n - \overline{\mu}_n \end{pmatrix}$$

-continued $$d = \begin{pmatrix} \mu_1^{(1)} - \mu_1^{(2)} \\ \cdot \\ \cdot \\ \cdot \\ \mu_n^{(1)} - \mu_n^{(2)} \end{pmatrix}$$

x is a feature value of an object to be inspected. Then, $D_2{}^2 - D_1{}^2 > 0 \rightarrow$ acceptable
$D_2{}^2 - D_1{}^2 < 0 \rightarrow$ unacceptable.

The priority N can be so set that the calculating time of the feature values becomes largest among the allowable time or the reliability of the inspecting is higher than a predetermined percentage. Since the ratio for correct discerning is gradually increased as the number or kind of feature values is increased, it is desirable to preset N so that the discerning ratio is not smaller than a predetermined value.

According to the embodiment, when an object is to be discerned as to whether or not the object is acceptable from the data quantized from the image data of the object taken by the image pick-up device, the Mahalanobis' generalized distance of two sets, that is, an acceptable group and an unacceptable group is obtained for each of a plurality of feature values, and the feature value showing a large Mahalanobis' generalized distance is selected with priority. Therefore, discerning of the object, for example, a character pattern printed on an electronic component or the like is carried out effectively in a short time.

The largest value among the Mahalanobis' generalized distances is respectively selected with the first to third priorities in the embodiment to determine the first through third representative feature values. However, for example, the following modifications can be applied to the present invention. That is, the second largest value among the Mahalanobis' generalized distances which are not smaller than a first predetermined value used for selecting the first representative feature value can be selected as the first representative feature value, and then the second largest value among the Mahalanobis' generalized distances which are not smaller than a second predetermined value used for selecting the second representative feature value can be selected as the second representative feature value. Alternatively, the largest value among the Mahalanobis' generalized distances which are not smaller than the first predetermined value used for selecting the first representative feature value can be selected as the first representative feature value, and then the second largest value among the Mahalanobis' generalized distances which are not smaller than the second predetermined value used for selecting the second representative feature value can be selected as the second representative feature value. Alternatively, the second largest value among the Mahalanobis' generalized distances which are not smaller than the first predetermined value used for selecting the first representative feature value can be selected as the first representative feature value, and then the largest value among the Mahalanobis' generalized distances which are not smaller than the second predetermined value used for selecting the second representative feature value can be selected as the second representative feature value.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In an image inspection process in which an object to be recognized is viewed with an image pick-up device, an output of the image pick-up device is converted into binary coded image data, a plurality of shape feature values of the binary coded image data are calculated, and an acceptability of the object is automatically discerned by comparing the plurality of shape feature values with predetermined values, the improvement comprising a preprocessing method for prioritizing the plurality of shape feature values used in the image inspection process so as to minimize a number of the shape feature values which must be processed to discern the acceptability of the object, said preprocessing method comprising:

viewing a predetermined group of sample acceptable objects and a predetermined group of sample unacceptable objects with an image pick-up device to obtain respective image outputs of the sample acceptable objects and the sample unacceptable objects;

converting the image outputs of the image pick-up device into a binary coded image data for each of the sample acceptable objects and sample unacceptable objects;

computing at least three shape feature values of each of the binary coded image data for each of the sample acceptable objects and sample unacceptable objects;

computing a first Mahalanobis' generalized distance between the binary coded image data of the sample acceptable objects and the binary coded image data of the sample unacceptable objects with respect to each of the at least three shape feature values;

designating as a first representative shape feature value a first one of the at least three shape feature values having a first Mahalanobis' generalized distance which is not smaller than a first value;

computing a second Mahalanobis' generalized distance between the binary coded image data of the sample acceptable objects and the binary image data of the sample unacceptable objects with respect to each of the at least three shape feature values, except for the first one of the at least three shape feature values, relative to the first one of the at least three shape feature values; and designating as a second representative shape feature value a second one of the at least three shape feature values, except for the first one of the at least three shape feature values, having a second Mahalanobis' generalized distance which is not smaller than a second value;

wherein the first and second representative shape feature values are given priority in the image inspection process to discern the acceptability of an object to be inspected.

2. In an image inspection process as claimed in claim 1, wherein the first representative shape feature value is designated as a first one of the at least three shape feature values having a maximum first Mahalanobis' distance.

3. In an image inspection process as claimed in claim 2, wherein the second representative shape feature value is designated as a second one of the at least three shape feature values, except for the first one of the at least three shape feature values, having a maximum second Mahalanobis' distance.

4. In an image inspection process as claimed in claim 1, wherein the second representative shape feature value is designated as a second one of the at least three shape feature values, except for the first one of the at least three shape feature values, having a maximum second Mahalanobis' distance.

5. An image inspection method comprising a preprocess for prioritizing a plurality of shape feature values and an inspection process for discerning the acceptability of an object using the plurality of shape feature values prioritized in said preprocess;

said preprocess comprising, (a) viewing a predetermined group of sample acceptable objects and a predetermined group of sample unacceptable objects with an image pick-up device to obtain respective image outputs of the sample acceptable objects and the sample unacceptable objects, (b) converting the image outputs of the image pick-up device into a binary coded image data for each of the sample acceptable objects and sample unacceptable objects, (c) computing at least three shape feature values of each of the binary coded image data for each of the sample acceptable objects and sample unacceptable objects, (d) computing a first Mahalanobis' generalized distance between the binary coded image data of the sample acceptable objects and the binary coded image data of the sample unacceptable objects with respect to each of the at least three shape feature values, (e) designating as a first representative shape feature value a first one of the at least three shape feature values having a first Mahalanobis' generalized distance which is not smaller than a first value, (f) computing a second Mahalanobis' generalized distance between the binary coded image data of the sample acceptable objects and the binary image data of the sample unacceptable objects with respect to each of the at least three shape feature values, except for the first one of the at least three shape feature values, relative to the first one of the at least three shape feature values, and (g) designating as a second representative shape feature value a second one of the at least three shape feature values, except for the first one of the at least three shape feature values, having a second Mahalanobis' generalized distance which is not smaller than a second value;

said inspection process comprising, (a) viewing the object to be recognized with an image pick-up device to obtain an image output of the object to be inspected, (b) converting the image output of the image pick-up device into binary coded image data of the object to be inspected, (c) computing the first and second representative shape feature values of the binary coded image data of the object to be inspected, and (d) discerning an acceptability of the object to be inspected by comparing at least the computed first representative shape feature value, or the computed first and second representative shape feature values, of the binary coded image data with predetermined values.

6. An image inspection method as claimed in claim 5, wherein the first representative shape feature value is designated as a first one of the at least three shape feature values having a maximum first Mahalanobis' distance.

7. An image inspection method as claimed in claim 6, wherein the second representative shape feature value is designated as a second one of the at least three shape feature values, except for the first one of the at least three shape feature values, having a maximum second Mahalanobis' distance.

8. An image inspection method as claimed in claim 5, wherein the second representative shape feature value is designated as a second one of the at least three shape feature values, except for the first one of the at least three shape feature values, having a maximum second Mahalanobis' distance.

* * * * *